Aug. 1, 1950 G. A. HOLMBERG 2,517,315
FRAMING GAUGE
Filed Nov. 13, 1947 2 Sheets-Sheet 1
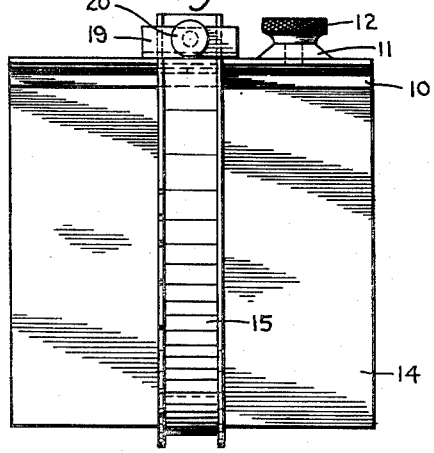
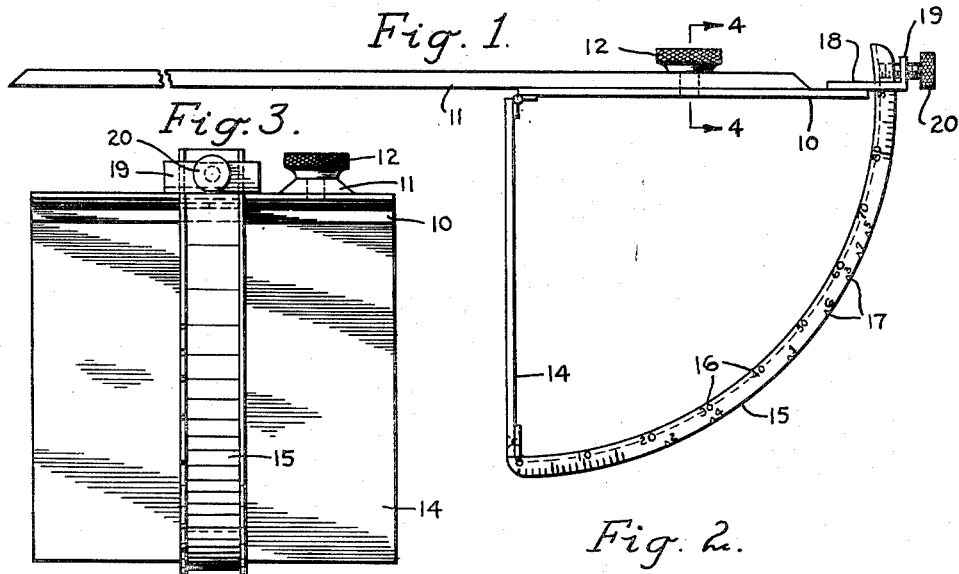
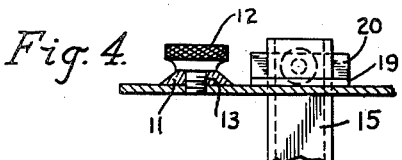
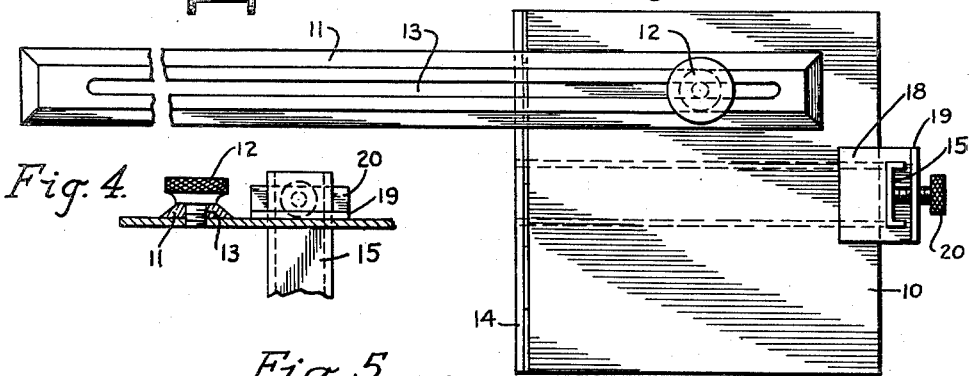
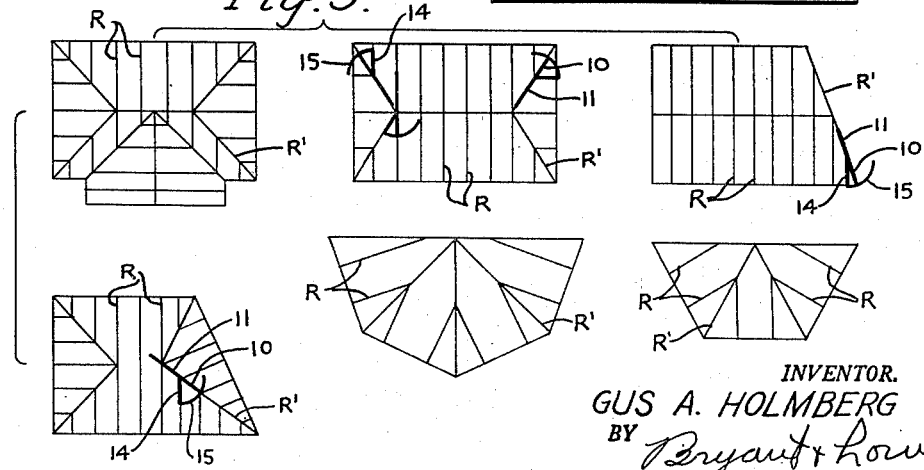
INVENTOR.
GUS A. HOLMBERG
BY Bryant & Lowry
attys.

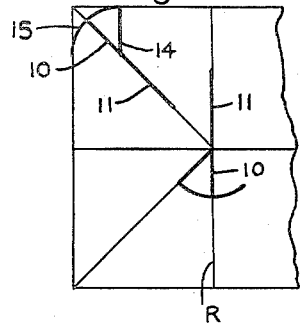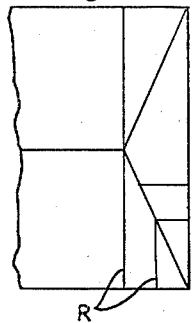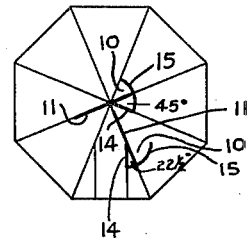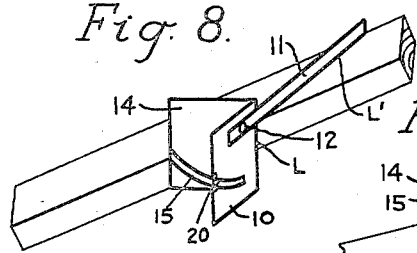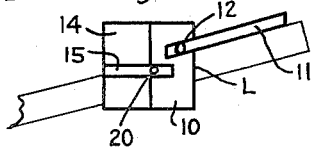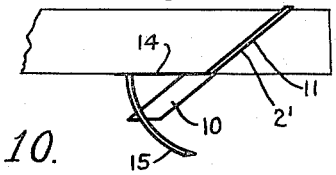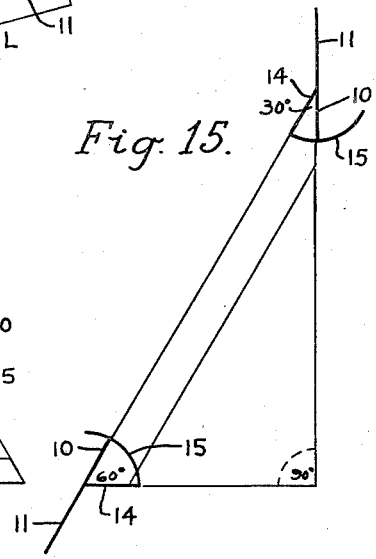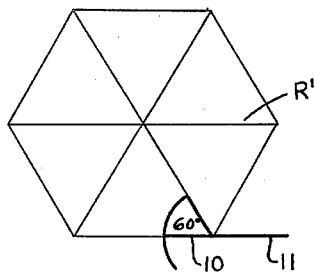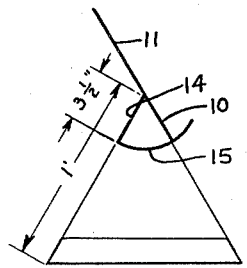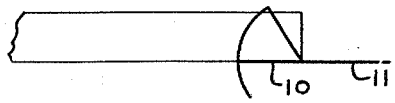

Patented Aug. 1, 1950

2,517,315

UNITED STATES PATENT OFFICE 2,517,315

FRAMING GAUGE

Gus A. Holmberg, Highwood, Ill.

Application November 13, 1947, Serial No. 785,738

1 Claim. (Cl. 33—90)

This invention relates to framing gages and has special reference to a framing gage for use in laying-off the ends of roofing members such as rafters and the like.

One important object of this invention is to provide a very simple device for the purpose set forth wherewith a person comparatively unskilled may properly lay out rafters and the like as efficiently as the most skilled house carpenter.

A second important object of the invention is to provide a simple tool of this character whereby a relatively unskilled person may readily lay out the lines on a rafter to show the sawing lines for a rafter and wherein such end is inclined to two adjacent sides of a rafter.

A third important object of the invention is to provide a novel tool for the purpose set forth and having direct reading means for setting the instrument to desired angles.

It is a further object of the invention to provide a gage structure which will withstand heavy and strenuous field use and the scale bearing member of which is particularly designed to resist undesirable deformation with consequent loss of accuracy of the instrument or possible inoperativeness thereof.

With the above and other objects in view, as will be presently apparent, the invention consists in general of certain novel details of construction and combinations of parts hereinafter fully described, illustrated in the accompanying drawings and particularly claimed.

In the accompanying drawings, like characters of reference indicate like parts in the several views, and Figure 1 is a top plan view of the instrument constituting the invention;

Figure 2 is a side elevation of the marker-bearing plate with the remaining elements of the instrument properly positioned thereon;

Figure 3 is an end elevation of the marker-bearing plate with the remaining elements of the plate properly positioned relative thereto;

Figure 4 is a detail sectional view taken on line 4—4 of Figure 1;

Figure 5 is a composite schematic diagrammatic view showing various types of roofs wherein rafter side cuts are required, some of the diagrams including the schematic position of the implement to ascertain the controlling angle for the side cut;

Figure 6 is a diagram showing the application of the tool to a diagram of an even pitch roof;

Figure 7 is a similar view of an uneven pitch roof;

Figure 8 is a schematic view showing the application of the implement to the side of an embryo rafter, the view indicating an intermediate stage in the marking of the rafter for the production of a side cut;

Figure 9 is a schematic top plan view of the completion of the stage development shown in Figure 8, with the implement in position to permit marking of the line of cut to be made;

Figure 10 is a schematic view in side elevation of the assemblage of Figure 9;

Figure 11 is a schematic diagram of an octagon roof, showing the implement positioned relative thereto to obtain the side cut angles for the hip rafters and the jack rafters respectively;

Figure 12 is a diagram of a hexagon showing the implement applied for obtaining the mitering angle;

Figure 13 is a schematic diagrammatic view showing the use of the implement for providing the marking for the miter cut of a roof plate;

Figure 14 is a schematic view showing the use of the tool in developing the length value of a roof plate; and Figure 15 is a schematic diagrammatic view indicating the manner in which the implement is used in the production of plumb and level cuts, and also the length of rafter.

In the embodiment of the invention as here shown there is provided a flat plate 10 whereon is mounted a marker blade 11, the mounting being effected by a thumb-screw 12 passing through a slot 13 extending longitudinally of the blade. This blade is so beveled as to provide sub-acute side edges in the plane of the blade bearing surface of the plate 10. Hinged to that edge of the plate 10 from which the blade 11 projects is a plate 14 of substantially the same size as the plate. Fixed to the free edge of the plate 14 and extending concentrically of the hinge axis is an arcuate gage member 15 which is U-shaped in cross-section, as shown in Fig. 3 of the drawing, and with its legs directed radially of the hinge axis. On the outer faces of the arcuate gage member 15 are provided degree graduations 16 and proportional graduations 17 which are selectively employed in the setting of the instrument for use.

Fixed on the surface of the plate 10 which supports the blade 11 is a guide member 18 wherethrough the member 15 slidably passes. As shown in Fig. 4 of the drawing, the member 15 passes through a slot in the guide member 18 which corresponds in shape to the cross-section of the member 15. The free edge of the member 18 is provided with a flange 19 and a binding screw 20 which serves, when screwed up, to hold the member 15 in adjusted position, and, when released, to allow the member 15 to slide freely through the plate 18 for adjustment of the angular relation.

The particular design of the U-shaped, arcuate member 15 is of considerable significance. An instrument used by carpenters and workers in the field is subjected to vary hard use and must retain its accuracy under severe conditions. The radially directed flanges of the U-shaped member 15 stiffen it strongly against flattening inwardly or bending outwardly with consequent failure of the member to slide thru its guide 18. The channel shape of the member also resists bending and distortion in a direction perpendicular to the calibrated faces. The cooperation of this member 15 with the U-shaped slot in its guide 18 also gives greater rigidity, sturdiness and accuracy to the whole gage structure.

In the use of the invention to cut a bevel on the eave ends of such rafters as are shown at R in the various diagrams, it is only necessary to form what may be termed a simple bevel. For this purpose the pitch angle of the rafter is obtained from the construction drawings and the gage member 15 is set to that angle. The plate 14 is laid on what will be the top faces of the rafters with the blade 11 extending along a side of the rafter. A scribe line is then drawn along the blade on the rafter side and the rafter cut along this line.

The manner of laying off compound bevels such as exist in hip rafters as indicated at R' is best shown by reference to Figures 8, 9 and 10. Here, from the drawings, the bevel in one direction is laid off as for a single bevel, a line such as L being scribed. Now, using the angle at right angles to that just used, the plates 10 and 14 are adjusted thereto. The hinge edge of the plate 10 is then lined up with the line 11 and the blade 11 positioned to lie in contact with the face of the rafter and a line scribed as at L'. The rafter is then cut along the lines L and L'. Thus any form of compound bevel for a roof joint may be laid off.

What is claimed is:

In a device for the purpose described, a pair of rectangular plates hingedly connected along corresponding edges, an arcuate graduated member having one end attached to the free edge of one plate and extending concentrically of the hinge axis, said member being U-shaped in cross-section with the legs thereof directed radially and with the graduations on the outer faces of said legs, a guide carried by the free edge of the other plate having a U-shaped guide slot therein slightly larger than the cross-sectional dimensions of said arcuate member and having said arcuate member extending therethrough, a clamping screw carried by the guide for engagement with the arcuate member, and a scriber guiding blade carried by one of said plates.

GUS A. HOLMBERG.

REFERENCES CITED

The following references are of record in the file of this patent:

UNITED STATES PATENTS

| Number | Name | Date |
|---|---|---|
| 1,343,604 | Winn | June 15, 1920 |
| 2,288,213 | Smith | June 30, 1942 |